United States Patent [19]

Bayer

[11] 3,902,883

[45] Sept. 2, 1975

[54] METHOD OF PRODUCING A STACK OF PLATES

[75] Inventor: Helmut Bayer, Vienna, Austria

[73] Assignee: Electrovac, Fabrikation elektrotechnischer spezialartikel Gesellschaft m.b.H., Vienna, Austria

[22] Filed: June 7, 1973

[21] Appl. No.: 367,814

Related U.S. Application Data

[62] Division of Ser. No. 213,372, Dec. 29, 1971.

[30] Foreign Application Priority Data

Dec. 30, 1970  Austria .............................. 11766/70

[52] U.S. Cl. .......................................... 65/43; 65/58
[51] Int. Cl. ............................................. C03b 23/24
[58] Field of Search ................................... 65/43, 58

[56] References Cited
UNITED STATES PATENTS 2,198,578  4/1940  Hazelton, Jr. et al. ............. 65/58 X
3,103,429  9/1963  Kruger et al. ....................... 65/58 X
3,440,031  4/1969  Babcock ............................. 65/58 X

FOREIGN PATENTS OR APPLICATIONS 535,155  3/1941  United Kingdom ..................... 65/43

*Primary Examiner*—Arthur D. Kellogg
*Attorney, Agent, or Firm*—Ernest G. Montague; Karl F. Ross; Herbert Dubno

[57] ABSTRACT

A method of the production of a stack of glass plates which comprises the steps of covering a first plate of glass with grains (particles) of a grain fraction (particle-size fraction), limited to no more than 25 microns with no more than 25% of the particles being of the upper grain-size limit, whereby the grains are spacedly disposed in a single layer; at distances surpassing the average grain size. The second plate of glass is applied to the first plate of glass, and the process is repeated until the desired number of glass plates have been stacked, and the stack is heated with application of pressure, and finally the stack is cooled.

8 Claims, 7 Drawing Figures

METHOD OF PRODUCING A STACK OF PLATES

This a division of my copending U.S. Pat. application Ser. No. 213,372, filed on Dec. 29, 1971.

The present invention relates to a method of producing a stack of plates, consisting of two or more plates, of glass or synthetic material, with a narrow spacing of a maximum of about 100 $\mu$m.

Stacks of plates of this type find use in electrode systems, for fuel cells, for lighting surfaces and condensors, where it is essential to maintain an exact spacing even under pressure or loading. The spacing is small in relation to the longitudinal and lateral extension of the plates. The stack should also be able to withstand rough treatment.

Heretofore strips or a frame of a foil were disposed between the plates at their edges, the thickness of the foil corresponding the spacing. In the Austrian Pat. No. 284,361, a method of producing multiple glass units wherein the plates are melted together with the formation of a stay at the edge, has been described.

In the known constructions it is a disadvantage that the spacing does not remain constant, especially remote from the edge, upon the application of pressure loads.

It is an object of the present invention to provide a method of producing a stack of plates in which the aforementioned drawbacks are avoided. This is achieved by providing for the spacing a single layer of rigid grains between the plates by which the open distance of the plates is determined; the average distance of the grains in each layer from their nearest neighbors is appreciably larger, preferably at least ten times larger, than the mean grain size.

With the method according to the present invention an appreciable improvement of the rigidity and exactness of the spacing is brought about, whilte achieving greater rigidity, thinner plates can be used, which simplifies the practical application of the pile of plates. The grains occupy at a maximum only about one percent of the hollow space, so that they do not disturb generally.

Suitably the plates consist of transparent material.

Advantageously their plates are covered on the faces turned towards each other at least partly with a preferably transparent layer which may be electrically conductive while the grains consist of insulating material and are disposed even at the plate locations covered with the conductive layer.

In the production of a pile of glass plates in accordance with the present invention the first glass plate plate is covered with grains of a particle-size which, for an upper size limit of no more than 25 microns deviates by no more than 6 microns and in the case of an upper size limit of more than 25 microns deviates by no more than 25% of the upper limit from each other; the grains are spaced apart by means of a sieve or by spraying. Sieve pressure members, vibration distribution or the like may be used to ensure distribution in a single layer, with spacings which surpass appreciably the average grain size. Then the second glass plate is applied to the first glass plate covered with grains, the steps being repeated until the stack consists of the desired number if glass plates, whereupon the total pile is heated while pressure is exerted on the stack. The latter is then subjected to cooling.

For particular precision of the spacing, the first glass plate is covered with spacing devices in strip form of heat resistant material over a part of the face turned toward the second glass plate and the remaining face of the glass plate is covered with grains of a fraction, particle-size whose lower limit equals at least the thickness of the spacing devices, is described. The first glass plate is then covered with the second glass plate, these method steps being repeated until the stack comprises the desired number of glass plates, whereupon the entire stack is heated under pressure and finally cooled; the spacing devices are then removed if desired. The spacing devices consist of a material with a greater thermal expansion coefficient than that of the granular material.

In accordance with a further feature of the present invention, one part of the spacing devices consists of electrically conductive material with substantially the same thermal expansion coefficient as the granular material, whereby these distancing devices can remain between the glass plates after cooling and serve to effect electrically connection with electrically conducting layers (thin-layer-electrodes).

These and other objects will become more readily apparent from the following descripiton, reference being made to the accompanying drawing, in which.

Figure 1:
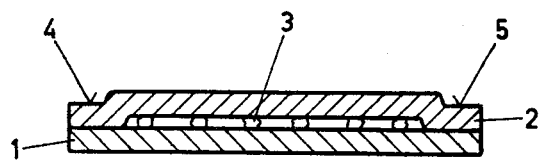
FIG. 1 is a section through a stack of plates, in accordance with the present invention.
Figure 3:
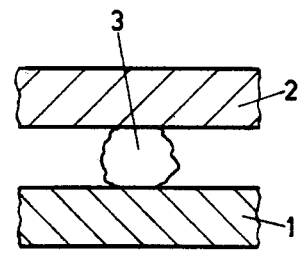
FIG. 3 to 6 are views of further embodiments in section and drawn to still further enlarged scale.
Figure 2:
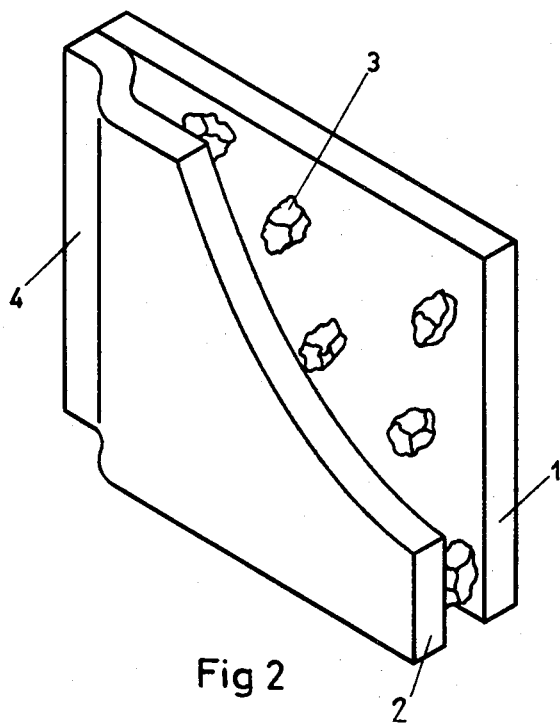
FIG. 2 is a section of the pile shown in FIG. 1 in a perspective view drawn to an enlarged scale.

In FIGS. 1 to 6, the pile of plates consists of two plates 1 and 2, which are narrowly spaced apart by means of grains 3, whereby the average spacing of the grains 3 surpasses appreciably the grains size, as can be ascertained in particular from FIG. 2. At least one of the materials used for the grains 3 or for the plates 1 and 2, with increasing temperature has a toughness which is with behavior which is manifested by glass and ceramic materials, such as thermo plasts.

FIGS. 3 to 6 show several possibilities of spacing of glass plates 1 and 2 by the grains 3. In the embodiment according to FIGS. 3 and 5 the grain softens prior to the plate material; in the embodiment of FIGS. 4 and 6 the plate material softens prior to the grain. Thus the plates and grains of glass consist of glass with different transformation ranges.

These embodiments possibilities are to be understood as extremes, between which continuous transitions exist. If, glass plates 1 and 2 and grains 3 consist of the same glass, the penetration of the corns 3 into the glass plates 1 and 2 is similar to that of FIG. 4, though markedly strongly, because the temperature of the grains 3 remains less than that of the glass plates 1 and 2.

The production of such stacks of plates is effected such that when the 15-hour-destraining temperature (strain-point) of the grains is lower then that of the glass plate material, the entire stack is heated to a temperature, in excess of the 15-hour-destraining temperature (strain-point) of the glass used for the grains and the 15-hour-destraining temperature (strain-point) of the glass used for the glass plates is not reached, whereupon the grains are compressed to the open distance to be produced and adhere to the glass plates and the electrode layers 6 and 7, respectively, whereupon the pile is cooled and any spacer devices are likewise removed.

In accordance with another embodiment, when the 15-hour-destraining temperature (strain-point) of the granular material is greater than that of the glass plate material, the entire stack is heated to a temperature, which surpasses the 15-hour-destraining temperature (strain-point) of the material used for the glass plates.

Figure 5:
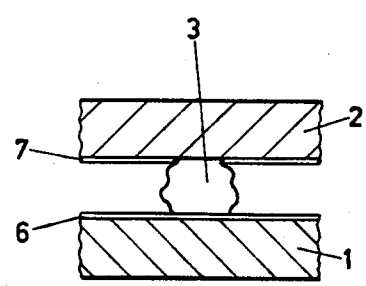
Figure 6:
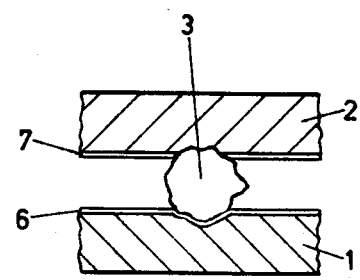

For many applications of the pile of plates it is required, that the plates 1 and 2 are equipped with electrodes on the faces pointing towards each other, which electrodes are represented in FIGS. 5 and 6 as thin layer electrodes 6 and 7. The thickness of such thin layer electrodes can be only 0.5 $\mu$m, while the spacing of the plates 1 and 2 for example amounts 20 $\mu$m. The distance of the grains 3 from each other depends upon the thickness of the plates 1 and 2. The thinner the plates are, the smaller must be the relative spacing of the grains 3 from each other; the relative spacing nevertheless appreciably exceeds the grain size. For example, it has been found that for about 0.8 mm thick plates with a plate distance of 20 $\mu$m, an average spacing of 150 $\mu$m is suitable.

In the embodiments shown in FIGS. 5 and 6, the grains 3 can engage the thin layer electrodes, as shown in FIGS. 5 and 6 in connection with plate 1 (thin layer-electrode 6), whereby the thin layer-electrode 6 can penetrate slightly into the plates in FIG. 6. They can, however, pass through the thin layer electrodes, as shown in FIGS. 5 and 6 for the plate 2 (thin layer-electrode 11).

By appropriate arrangement of thin layer electrodes, the plate stacks for the displaying of different figures, letter, numbers, or the like can be applied in known manner, whereby at least one of the electrodes is designed in form of the sign to be produced. This arrangement can advantageously find applications for controllable light gates, liquid crystal cells and the like. For this purpose the plates 1 and 2 are suitably at least partly connected at the edge zones 4 and 5. In the embodiment shown in FIG. 1 the connection takes place by hot press welding, i.e., the application of pressure and heat.

The glass plates are connected together over parts of their edges during the heating by being pressed more stongly against each other and are fused together.

In accordance with a further advantageous variation the glass plates are hermetically connected at least over part of their edge zones by means of a glass solder.

In this arrangement suitably the glass solder is applied by pressure through a sieve.

Figure 7:
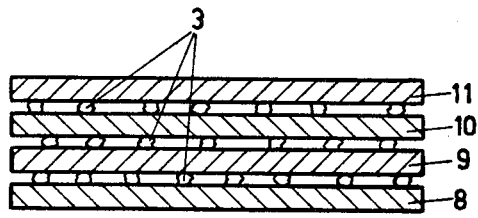
FIG. 7 is a section through a different embodiment of the present invention.
Figure 4:
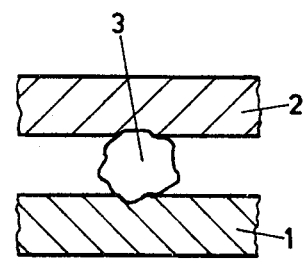

FIG. 7 shows a section through a plate pile designed with three spacer layers in accordance with the present invention. Four glass plates 8, 9, 10 and 11 are to each spaced by means of a respective single layer of grains 3.

Depending upon the use of such plate piles the plates 8, 9, 10 and 11 can be connected together by means of hot press welding at the edges as shown by example in FIG. 1 for the plates 1 and 2. The connection of the plates 8, 9, 10 and 11 can, however, be obtained as shown by means of a glass solder. In case such connection of the plates 8, 9, 10 and 11 at the edges is not required, the welding or soldering can be omitted, since the plates 8, 9, 10 and 11 are connected by the grains 3 which adhere to the plates, since in view of the measures in accordance with the present invention at least one of the working materials is brought into its transformation (softening) range and thus its molecular forces become effective.

The present invention is not limited to plates having plane plates. For the production of plate piles with curved plates advantageously the plate pile built together of plane plates is curved as a unit by heating.

Suitably the heating causing the curving is performed simultaneously, with a hot press welding causing the connection of the plate edges.

I claim:
1. A method of making a plate stack comprising the steps of:
   a. applying to a surface of a glass plate a thin-layer electrode;
   b. thereafter depositing on said surface a single layer of glass grains having a maximum particle size of about 100 microns and a minimum interparticle spacing at least 10 times greater than the minimum particle size, the particle size variation of the grains being no more than six microns for grains of an upper particle size of twenty five microns and being no more than 25% of the upper particle size for grains having an upper particle size greater than twenty five microns;
   c. applying a second glass plate having a thin-layer electrode on a surface thereof confronting the first mentioned glass plate to said layer of grains thereon;
   d. repeating steps (a) through (c) until a stack of a multiplicity of spaced apart plates is formed; and
   e. applying pressure to said stack and heating same to fuse said grains to said glass plates, thereby rendering said stack rigid while establishing a precise spacing between said plates.

2. The method defined in claim 1, further comprising the step of deforming an edge portion of at least one plate of each pair to hermetically seal the space between each pair of plates during step (e).

3. The method defined in claim 1, further comprising the step of inserting spacer strips between each pair of plates in addition to the respective layers of grains.

4. The method defined in claim 3 wherein said strips have thicknesses in excess of the average particle size of said grains.

5. The method defined in claim 3 wherein said strips are composed of a material having a greater coefficient of thermal expansion than said grains.

6. The method defined in claim 3 wherein said strips are composed of electrically conductive material and make electrical contact with at least one of said layers.

7. The method defined in claim 1 wherein said grains and said plates are composed of materials having different 15-hour destraining temperatures, said stack being heated in step (e) to a temperature above the lower 15-hour destraining temperature but below the upper 15-hour destraining temperature.

8. The method defined in claim 1, further comprising the step of bending the plates of said stack under heat and pressure in step (e).

* * * * *